United States Patent
Giffen

[15] 3,677,419
[45] July 18, 1972

[54] ARTICLE TRANSFER APPARATUS

[72] Inventor: James W. Giffen, 109 Sly Avenue, Corning, N.Y. 14830

[22] Filed: May 27, 1971

[21] Appl. No.: 147,426

[52] U.S. Cl. .............................................. 214/1 BV, 198/27
[51] Int. Cl. ....................................................... B65g 7/00
[58] Field of Search ..................... 214/1 BS, 1 BV, 1 B, 1 BD; 198/27

[56] References Cited

UNITED STATES PATENTS

| | | | |
|---|---|---|---|
| 1,766,573 | 6/1930 | Westin .............................. | 214/1 BD |
| 2,904,192 | 9/1959 | Reynolds et al. .................. | 214/1 BV |
| 3,294,256 | 12/1966 | Nazali et al. ....................... | 214/1 BD |

FOREIGN PATENTS OR APPLICATIONS

670,888  9/1963  Canada ............................. 214/1 BV

Primary Examiner—Gerald M. Forlenza
Assistant Examiner—Frank E. Werner
Attorney—Clarence R. Patty, Jr. and Charles W. Gregg

[57] ABSTRACT

Apparatus for individually and sequentially transferring from an article transfer station to an article receiving station each of a plurality or sequence of articles of ware such as disk or dish-like articles which are intermittently delivered in a selected time sequence to said transfer station. The apparatus includes a rocker arm having one end secured to a rockshaft for reciprocative movement through an approximately 180° vertical arc of travel and supporting on its second end an aeriform fluid chuck for carrying each article between the transfer station and the receiving station. The output shaft of an electric motor is connected to the input shaft of a gear box through electrically actuated clutch-brake means which are selectively energized in synchronism with the delivery of each article to the transfer station and the transfer of each article to the receiving station. The output shaft of the gear box is connected to supply the reciprocative movement to the rockshaft and the rocker arm through a rack and pinion gear means. Valve means are also provided to selectively supply negative and, if desired, positive aeriform fluid to the chuck in a selected relationship with the reciprocative movement of the rockshaft and the rocker arm.

14 Claims, 12 Drawing Figures

INVENTOR.
James W. Giffen
BY Charles W. Gregg
AGENT

Patented July 18, 1972

INVENTOR.
James W. Giffen
BY Charles W. Gregg
AGENT

ARTICLE TRANSFER APPARATUS

BACKGROUND OF THE INVENTION

Figures 1, 2:
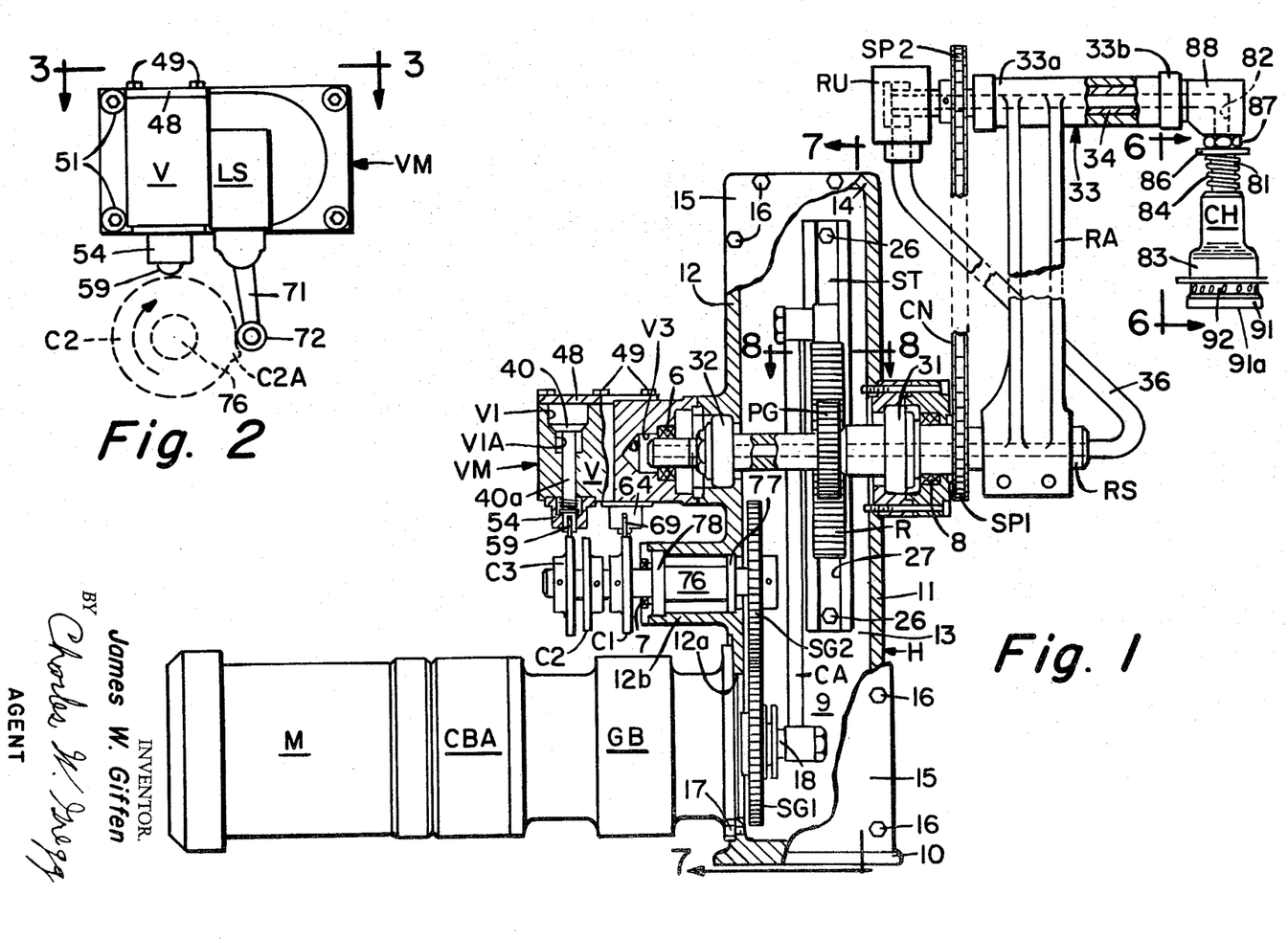
FIG. 1 is an elevational view of the apparatus embodying the invention with part of the housing for such apparatus substantially broken away to better illustrate the apparatus arrangement within such housing.
FIG. 2 is an elevational view of a limit switch and valve means comprising part of the apparatus of FIG. 1.

There is shown n U.S. Pat. No. 2,623,648, issued Dec. 30, 1952 to George E. Rowe, a glassware transfer apparatus in which there is employed a pneumatic or air actuated rack and pinion means for operating the glassware transfer means of the apparatus. Also, there is shown in FIG. 1 of U.S. Pat. No. 3,393,495 issued July 23, 1968 to Thomas F. Hillman et al. an article transfer mechanism 23 of a well-known type and employing a vacuum chuck for picking up each of a succession of articles, such as flat or relatively shallow dish-like articles, and for transferring each said article from an article transfer station to an article delivery or receiving station. Article transfer apparatus or mechanism such as shown and mentioned in said patents have not, however, been entirely satisfactory in their operation and, therefore, the article transfer apparatus of the present invention was developed to provide an article transfer means which operate more satisfactorily in transferring articles of the type mentioned from an article transfer station to an article receiving or delivery station.

SUMMARY OF THE INVENTION

In the practice of the invention disclosed, there is provided an aeriform fluid chuck which is carried on a first end of a rocker arm whose second end is secured to a rockshaft which is reciprocatively actuated by a rack and pinion gear means through approximately 180° of rotation by an electric motor having an output shaft connected through an electrically actuated clutch-brake means to the input shaft of a suitable gear box. The output shaft of said gear box is connected to said rack and pinion gear means for said rotation of said rockshaft and, thereby, actuation of said rocker arm through approximately an 180° vertical arc of movement extending between an article transfer station and an article receiving station. A set of cams are also provided for actuating electrical circuit means and valve means in synchronism with the arrival of each said article at said transfer station and in synchronism with said movement of said rocker arm for selectively energizing said clutch-brake means and supplying vacuum or negative aeriform fluid to said chuck means for pickup and transfer of each said article arriving at said transfer station.

Other characteristic features of the invention will become apparent as the description proceeds.

BRIEF DESCRIPTION OF THE DRAWINGS

In the drawings.

Similar reference characters used in the drawings designate similar parts of the apparatus herein disclosed.

PREFERRED EMBODIMENT OF THE INVENTION

Figure 7:
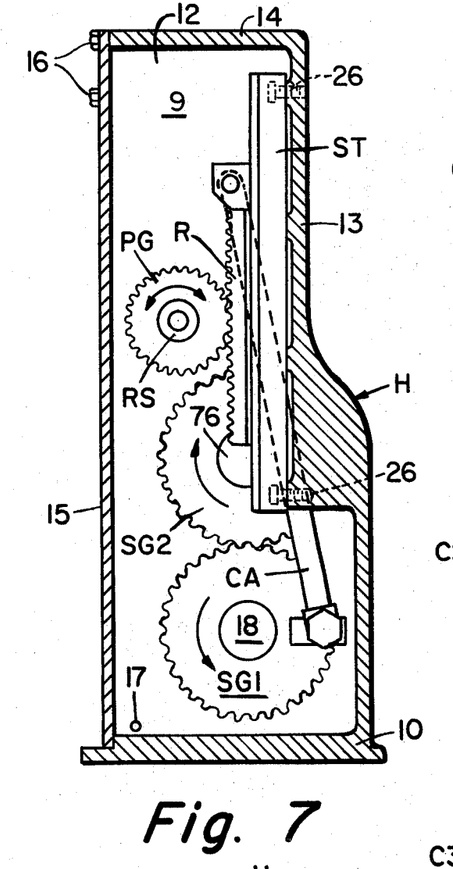
FIG. 7 comprises a cross-sectional view of the apparatus of FIG. 1, such view being taken generally along line 7—7 of FIG. 1.

Referring first to FIGS. 1 and 7 of the drawings in detail, there is shown an apparatus housing H comprising a composite member 9 including a base 10, a front wall 11, a back wall 12, one side wall 13, a top wall 14 and, in conjunction therewith, a second side wall 15 which, in practicing the invention disclosed, is secured, as by screws such as 16, to composite member 9 with a sealing material or suitable gasket to provide an oil leakproof seal between the otherwise contacting parts of composite member 9 and said second sidewall 15. Housing H also embodies, adjacent base 10 and in the back wall 12 of such housing, a drain plug 17 for draining an oil from the interior of the housing when it is so desired. A suitable opening is provided in the top wall 14 of housing H for supplying said oil or lubricant into the housing but such opening is not shown in the drawings for purposes of simplification thereof. Back wall 12 of housing H also embodies an opening 12a against the exterior surface of which is disposed, in a sealed relationship therewith, a flange portion of a gear box GB whose output shaft 18 extends into the interior of housing H. The input shaft 19 (FIG. 12) of gear box GB is mechanically connected or coupled to the output shaft 21 of an electrically controlled or activated clutch-brake means or assembly CBA whose input shaft 22 is connected or coupled with the output 23 of shaft of an electric motor M. Such arrangement is not shown in detail in FIG. 1 of the drawings but is shown schematically in FIG. 12 since such arrangements of motors, clutch-brakes and gear boxes are well known. This will also be further discussed hereinafter in an operational example of the invention taken in conjunction with FIG. 12 of the drawings.

Figure 8:
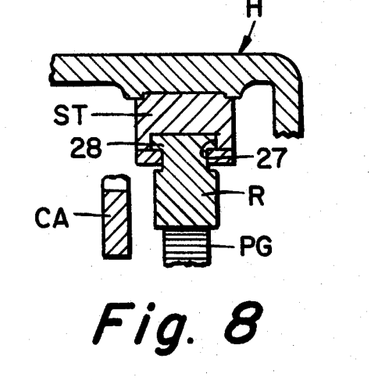
FIG. 8 comprises a cross-sectional view, on an enlarged scale, of part of the apparatus of FIG. 1, such view being taken generally along line 8—8 of FIG. 1.
Figure 9:
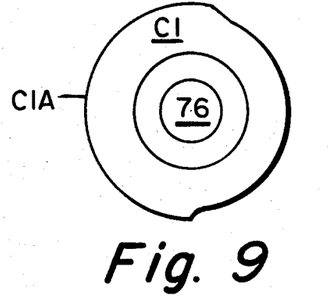
FIGS. 9, 10 and 11 are views, on an enlarged scale, of cam wheels used in practicing the invention disclosed.
Figure 10:
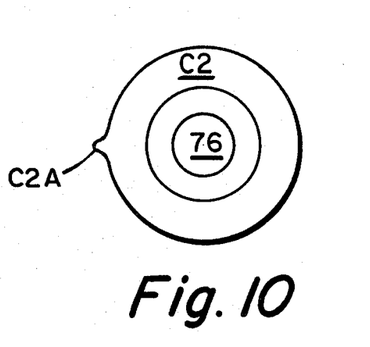
Figure 11:
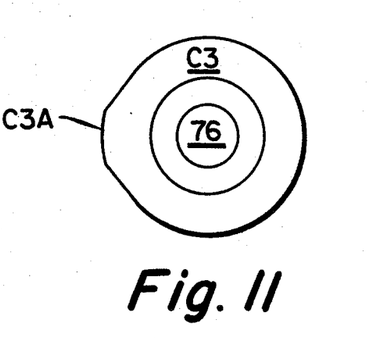

There is keyed to previously mentioned output shaft 18 of gear box GB, and in a rotational relationship therewith, a first spur gear SG1 whose teeth mesh with the teeth of a second spur gear SG2 to be hereinafter further discussed. A first or lower end of a crank arm CA is pivotally and eccentrically connected to the otherwise free face of spur gear SG1 for driven reciprocative motion of the crank arm by rotation of such spur gear. The second or upper end of crank arm CA is pivotally connected with the upper end of a rack R having teeth meshing with the teeth of a pinion gear PG which is keyed to a hollow rockshaft RS for driven reciprocative rotation thereof by reciprocative linear motion of said rack in the manner well known in rack and pinion gear arrangements. Rack R is supported in housing H by a vertically extending slide track ST (FIGS. 1, 7 and 8) which is affixed to sidewall 13 of housing H as by screws or bolts such as 26. Slide track ST includes a groove or channel 27 (FIGS. 1 and 8) in which a longitudinal flange portion 28 provided on the back of rack R (FIG. 8) fits in a relatively snug but slidable relationship therewith.

Previously mentioned rockshaft RS is rotatably mounted in housing H by extending through suitable bearings 31 and 32 supported in the front and back walls 11 and 12, respectively, of housing H. The end of rockshaft RS extending through bearing 31 has clamped or otherwise affixed thereto, in a driven rotational relationship therewith, a first end of a rocker arm RA whose second end is secured to one end 33a and supports a hollow and preferably substantially horizontally extending arm 33 having a hollow tube 34 extending snugly but rotatably through the hollow of such arm 33 with the first and second ends of such tube 34 also extending beyond the ends 33a and 33b of arm 33. A vacuum or pressurized fluid chuck CH is supported on, depends from, and is affixed to the end of tube 34 which extends through end 33b of arm 33 and such chuck CH embodies an aeriform fluid passage 82 which hermetically connects with the hollow of said tube 34. Chuck CH will be discussed in more detail hereinafter in conjunction with FIG. 6 of the drawings. A leakproof annular seal 8 surrounds rockshaft RS adjacent previously mentioned bearing 31.

The end of tube 34 which extends through end 33a of arm 34 is provided with a rotary union RU and the hollow in such tube is thereby hermetically connected through such union RU to a first end of a fluid conduit or pipe 36 whose second end is hermetically connected to the hollow extending through rockshaft RS and to the end of such hollow which is adjacent the end of rockshaft RS to which there is clamped, or otherwise has affixed thereto, said first end of rocker arm RA. Rotary unions such as RU are old and well known in the art. There is mounted, adjacent the end of tube 34 which is connected to said rotary union RU, a sprocket wheel SP2 which is keyed to tube 34 to provide a limited amount of rotational movement of such tube as further mentioned below. Another sprocket wheel SP1 is affixed, in any convenient manner, to the part of the front wall 11 of housing H which supports the aforementioned bearing 31 through which rockshaft RS extends. An endless drive chain CN extends or is looped about the teeth of sprocket wheels SP1 and SP2 in the manner well known in the art and for the well-known purpose hereinafter mentioned.

Figures 3, 4, 5, 6:
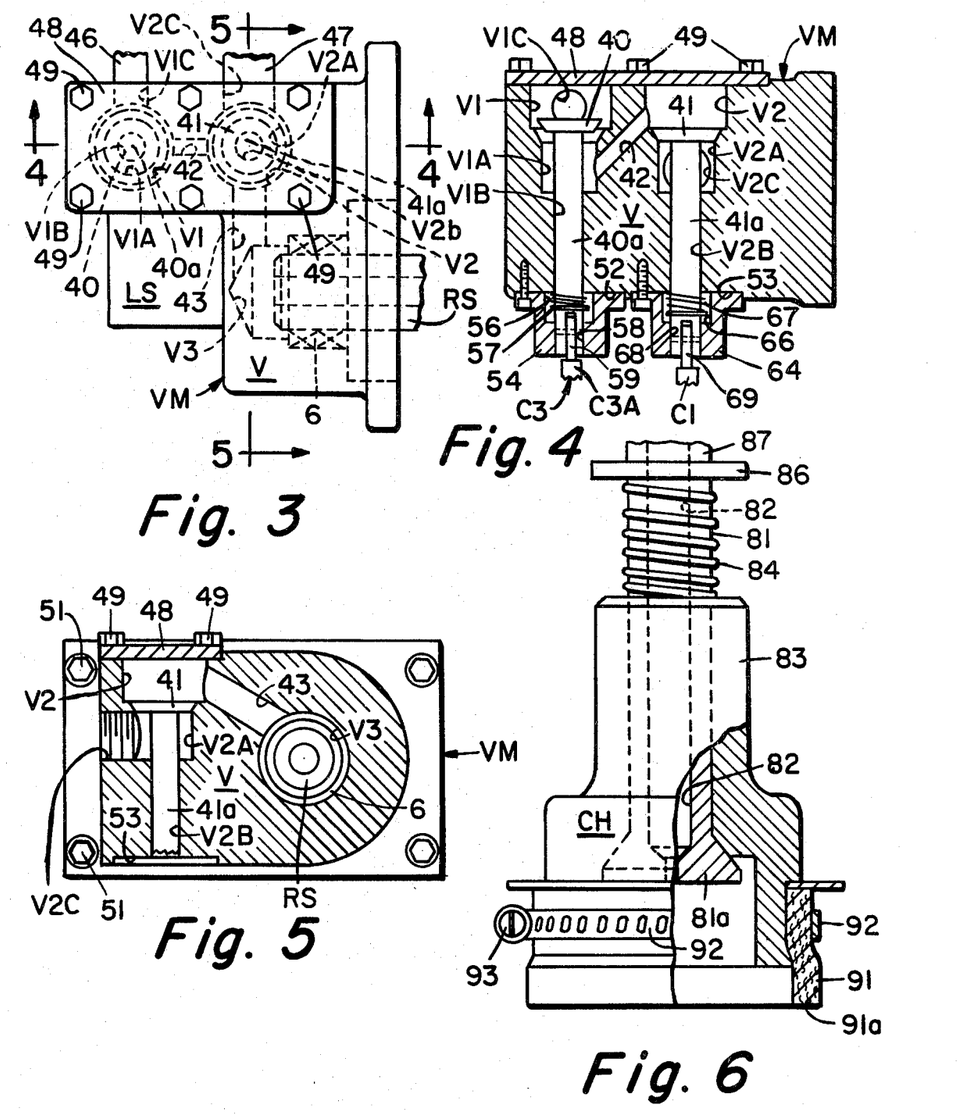
FIG. 3 is an enlarged top plan view of the apparatus of FIG. 2, such view being taken generally along line 3—3 of FIG. 2.
FIG. 4 comprises a cross-sectional view of the apparatus of FIG. 3, such view being taken generally along line 4—4 of FIG. 3.
FIG. 5 comprises a cross-sectional view of the apparatus of FIG. 3, such view being taken generally along line 5—5 of FIG. 3.
FIG. 6 is an enlarged elevational view, partially in cross-section, of a vacuum chuck comprising part of the apparatus of the present invention shown in FIG. 1, such view being taken generally along line 6—6 of FIG. 1.

The end of rockshaft RS, which extends through bearing 32 supported in the back wall 12 of housing H, also extends into an aeriform fluid control or valve means VM and the hollow in rockshaft RS hermetically connects with an aeriform fluid chamber V3 embodied in main body member V of flow control means or valve VM so that aeriform fluid can be supplied, as hereinafter discussed, to the hollow extending through rock-shaft RS and thence to previously mentioned chuck CH which as also previously mentioned, will be discussed hereinafter in more detail. A leakproof annular seal 6 (FIGS. 1 and 3) surrounds rockshaft RS adjacent the end thereof which extends into said chamber V3. Valve means VM, as best illustrated in FIGS. 3, 4, and 5 of the drawings taken in conjunction with FIG. 2, comprises a main body member V which embodies a positive pressurized aeriform fluid main pressure chamber V1 which is, at selected times hereinafter discussed, connected by actuation of a poppet valve 40 to a secondary chamber V1A for delivery to such chamber V1A of positive pressurized aeriform fluid and supplying such fluid through a passage 42 to a vacuum or negative aeriform fluid main chamber V2 also embodied in body member V which main chamber is, at selected times hereinafter discussed, connected by actuation of a poppet valve 41 to a secondary chamber V2A for delivery of negative aeriform fluid or vacuum to said chamber V2. A passage V1C extends from chamber V1 through body member V of valve means VM and connects to one end of a conduit or pipe 46 (FIG. 3) for supplying said positive pressurized aeriform fluid to chamber V1. A passage V2C extends from chamber V2A through body member V of valve means VM and connects to one end of a conduit or pipe 47 (FIG. 3) for supplying said vacuum or negative aeriform fluid to chamber V2A. The sources of said positive pressurized aeriform fluid and of said vacuum are not shown in the drawings for purpose of simplification thereof. Chamber V2 in body member V of valve means VM is also connected by a passage 43 (FIGS. 3 and 5) to the previously mentioned aeriform fluid chamber V3 also embodied in body member V of valve means VM. A plate 48 is secured to the top of valve means VM as by bolts such as 49 and hermetically seals chamber V1 and V2 embodied in the valve means. Valve means VM is hermetically secured as by Allen-head screws 51 (FIGS. 2 and 5) to the part of the back wall 12 of housing H which holds previously mentioned bearing 32 (FIG. 1) supporting rockshaft RS.

Valve stems 40a and 41a of previously mentioned poppet valves 40 and 41, respectively, extend snugly but slidably down through passages V1B and V2B which extend vertically through body member V of valve means VM from chambers V1A and V2A, respectively, and connect with recesses 52 and 53, respectively, provided in the bottom wall of said body member V. A flanged member 54 is secured in said recess 52 and embodies a chamber 56 in which there is housed a compression spring 57 surrounding valve stem 40a of poppet valve 40 near the lower end of such stem. The extreme lower end of valve stem 40a extends through a passage 58 embodied in the lower part of flange member 54, and such lower end is slotted and pivotally supports in such slot a roller or wheel 59 whose outer periphery rides or bears against the outer periphery of a cam wheel C3 to be hereinafter discussed. Compression spring 57 surrounding valve stem 40a biases poppet valve 40 downwardly in chamber V1 to seat or close therein in the manner well known in the art. However, as will be further discussed hereinafter, poppet valve 40 is illustrated in FIG. 4 as being open or unseated, that is, raised from its seated position by a raised part or point C1A on the outer periphery of cam wheel C3 pushing against roller 59 and, thereby, pushing valve stem 40a in a direction to unseat or open valve 40.

Another flanged member 64 is secured in the previously mentioned recess 53 provided in the bottom of body member V of valve means VM. Member 64 embodies a chamber 66 in which there is housed a compression spring 67 surrounding valve stem 41a of poppet valve 41 near the lower end of such stem. The extreme lower end of valve stem 41a extends through a passage 68 embodied in the lower part of flange member 64 and such lower end is slotted and pivotally supports in such slot a roller or wheel 69 whose outer periphery rides or bears against the outer periphery of a cam wheel C1 to be hereinafter discussed. Compression spring 67 surrounding valve stem 41a biases poppet valve 41 in chamber V2 to seat or close therein as illustrated in FIG. 4 and in the manner well known in the art.

An electrical circuit controlling limit switch LS is, as illustrated in FIGS. 2 and 3 of the drawings, secured in any convenient manner to main body member V of valve means VM. Such limit switch has an actuating arm 71 which extends downwardly from the bottom of limit switch LS (FIG. 2) and pivotally supports a wheel or roller 72 whose outer periphery rides or bears against the outer periphery of a cam wheel C2 to be hereinafter discussed. However, it is now pointed out that the actuation of arm 71 of limit switch LS in the right hand direction (viewing FIG. 2) opens a set of normally closed electrical circuit controlling contacts embodied in limit switch LS. Such actuation of arm 71 is performed by a high point C2A on cam wheel C2 during rotation of such cam wheel as hereinafter further discussed and, following the actuation of arm 71 by said high point C2A, arm 71 returns to its position shown in FIG. 2 and said electrical circuit controlling contacts embodied in the limit switch again become closed or return to their normally closed condition. Limit switches such as LS are well known components and, therefore, internal details of the switch are not shown in the drawings for purposes of simplification thereof. However, the set of electrical contacts embodied in limit switch LS are shown schematically in FIG. 12 and are designated LSC1 and LSC2. This will be further discussed hereinafter.

The previously mentioned second spur gear SG2 is suitably keyed to one end of an axle or shaft 76 (FIG. 1) for driven rotation of such shaft which is rotatably supported in suitable bearings 77 and 78 mounted and housed in an extension 12b of the back wall 12 of housing H. There is keyed to and adjacent the second end of shaft 76, which extends exteriorly of housing H, the previously mentioned cam wheels C1, C2 and C3 which are, thereby, rotatively driven by the driven rotation of axle or shaft 76 as hereinafter further discussed in more detail. A leakproof annular seal 7 surrounds shaft 76 adjacent previously mentioned bearing 78.

With reference to FIGS. 1 and 6 of the drawings, previously mentioned depending vacuum chuck CH comprises a tube-like member 81 through which the previously mentioned aeriform fluid passage 82 extends and connects at its upper end to the hollow in tube 34 extending through arm 33. A sleeve-like member 83 closely but slidably surrounds the outer periphery of the lower end of tube-like member 81 and a compression spring 84 surrounds portion 81 of chuck CH adjacent the upper end of such member 81. The lower end of such spring bears against the upper surface of sleeve member 83 while the upper end of such spring ears against the lower surface of a washer 86 whose upper surface bears against a nut 87 which is is threaded onto the upper end of tube-like member 81 of chuck CH. Thus, compression spring 84 normally biases sleeve member 83 downwardly against a lower flange portion 81a of member 81.

Chuck CH further includes at its upper end a support member 88 (FIG. 1) which is affixed, in any convenient manner, to the end of tube 34 extending out of end 33b or arm 33. Tube-like member 81 of chuck CH is supported to and on the bottom of support member 88 of such chuck in any convenient manner and so that fluid passage 82 hermetically connects, as previously mentioned, with the hollow extending through tube 34 extending through arm 33. A strip or annular band of a substantially heat resistant and somewhat resilient material 91 is wound about the lower end of sleeve-like member 83 and is secured to such lower end of such member by a well-known type of hose clamp 92 surrounding such strip and tightened thereabout by the usual screw such as 93. The lower annular portion of said strip 91 extends substantially below the bottom annular surface of member 83 as best illustrated in FIG. 6. Said strip 91 of said somewhat resilient material provides for substantially hermetical sealing between an article to be transferred and contacted by the lower annular surface 91a of such strip while also, in conjunction with spring 84, providing for cushioning between such a contacted article and chuck CH. This will be readily apparent to those skilled in the art. It is pointed out that the previously discussed apparatus arrangement, including sprockets SP1 and SP2, chain CN and tube 34, maintains chuck CH in a generally vertical depending attitude at all times during the reciprocative rotation of rockshaft RS and rocker arm RA, and arm 33, through their substantially 180° arc of movement or rotation so that said article contacting lower annular surface 91a of resilient strip 91 always extends generally parallel with a horizontally extending plane.

Figure 12:
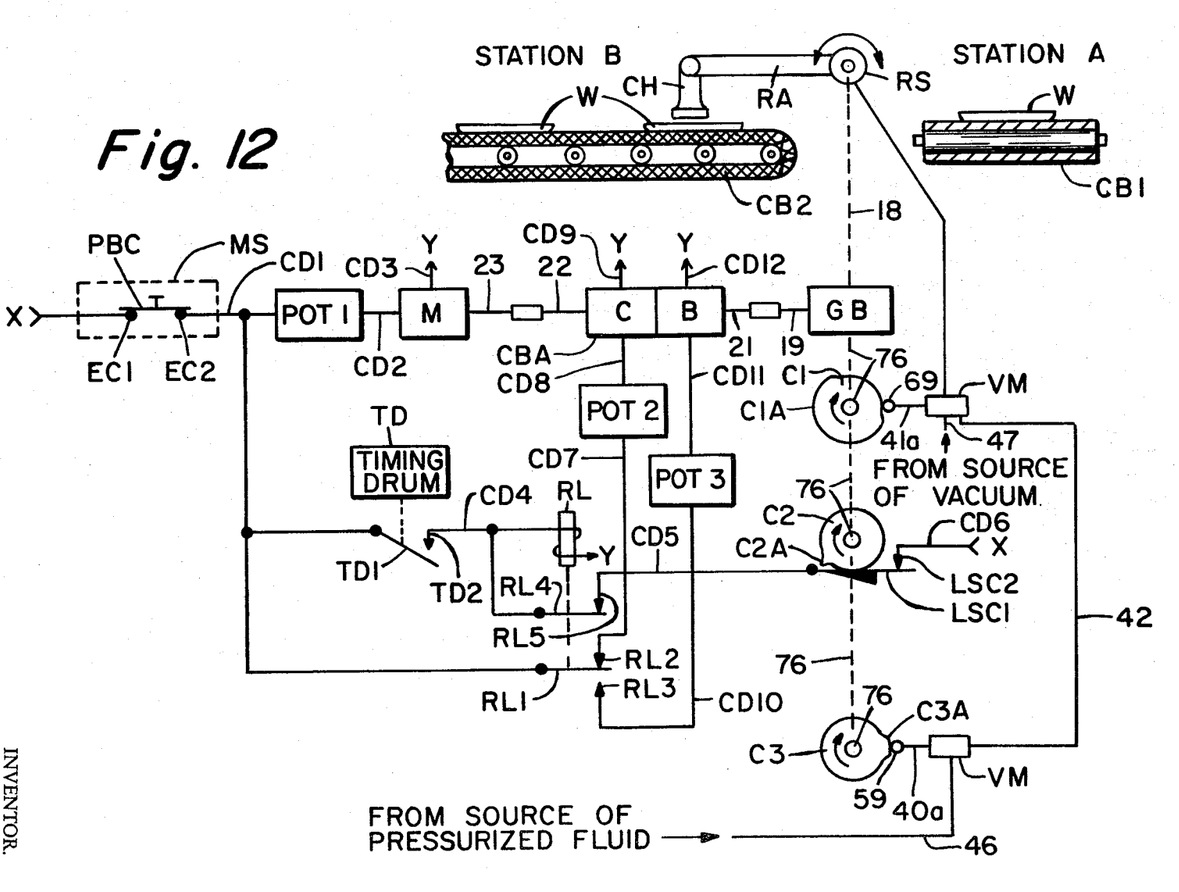
FIG. 12 is an operational schematic drawing provided for purposes of illustration of the operation of the apparatus disclosed herein.

Referring now to FIG. 12 of the drawings there is shown, schematically, a control system for the foregoing described apparatus of the invention. The components or parts designated in FIG. 12 as M, CBA, GB, RS, RA, CH, C1, C2, C3, VM, 18, 40a, 41a, 42, 46, 59, 69 and 76 correspond, respectively, to similarly designated components or parts shown in the other figures of the drawings as will be readily apparent to those skilled in the art. In addition, there is also shown in FIG. 2 an electrical circuit controlling master switch designated MS, first, second and third potentiometers designated POT1, POT2 and POT3, respectively, the electrically actuated clutch and brake of clutch-brake assembly CBA and designated C and B, respectively, a timing drum designated TD, an electrically controlled or actuated relay RL, and first and second conveyor belts designated CB1 and CB2, respectively. Conveyor belt CB1 delivers intermittently to an article transfer station, designated station A, articles or ware such as W which are to be transferred by the apparatus of the present invention to an article receiving or delivery station designated station B. Said articles or ware such as W are intermittently delivered in a timed sequence to said station A by conveyor belt CB1 which is under control of the previously mentioned timing drum TD. Conveyor belt CB2 is merely controlled to move at a sufficient speed to move each article of ware, such as W transferred thereto by the apparatus of the invention, out of the way of the next succeeding article of ware to be so transferred to conveyor belt CB2.

Referring now to FIG. 12 of the drawings in more detail, master switch MS includes an electrical contact EC1 which is connected to terminal X of a source of electrical current suitable for actuation or activation of the electrically energized apparatus employed but which is not shown in the drawings for purposes of simplification thereof. Switch MS further includes an electrical contact EC2 which is connected over a suitable electrical conductor CD1 to an input terminal of potentiometer POT1, to a movable contact member TD1 of a set of electrical circuit contacts TD1 and TD2 of timing drum TD and to a first movable contact member RL1 of a set of electrical circuit controlling contacts RL1, RL2 and RL3 of relay RL. Switch MS further includes a manually actuated push button contact PBC which, when manually depressed, makes an electrical connection between said electrical contacts EC1 and EC2 of such switch. After such a depression of push button contact PBC said electrical connection is maintained until the push button contact is pulled to interrupt the electrical connection between said contacts EC1 and EC2. The output terminal of potentiometer POT1 is connected over an electrical conductor CD2 to the one terminal of previously discussed electric motor M whose second terminal is connected over another conductor CD3 to the second terminal Y of the previously mentioned current source.

Fixed contact member TD2 of timing drum TD is connected over a conductor CDA terminal of the control winding of relay RL and to a second movable contact member RL4 of a set of electrical circuit controlling contacts RL4 and RL5 of such relay RL. Fixed contact member RL5 of relay RL is connected over a conductor CD5 to previously mentioned contact LSC1 of limit switch LS which is the movable contact member of such switch. Fixed contact member LSC2 of switch LS is connected over a conductor CD6 to previously mentioned terminal X of said current source. Previously mentioned and fixed contact member RL2 of relay RL is connected over a conductor CD7 to one terminal of potentiometer POT2 whose second terminal is connected over a conductor CD9 to previously mentioned terminal Y of said current source. Previously mentioned and fixed contact member RL3 of relay RL is connected over a conductor CD10 to one terminal of potentiometer POT3 whose second terminal is connected over a conductor CD11 to one terminal of the brake B of clutch-break assembly CBA whose second terminal is connected over a conductor CD12 to said terminal Y of said current source. It is pointed out that the article transfer apparatus of the invention for purposes of clarity of illustration of the structure of such apparatus, is shown in FIG. 1 with rocker arm RA in a vertical position. However, in FIG. 12 rocker arm RA is shown in a horizontal position immediately following the transfer by such arm of a piece of ware or article such as W to station B, that is, to the article receiving station.

The apparatus comprising the invention having been described in detail, an operational example of the invention will be given with reference to FIG. 12 taken in conjunction with the other FIGS. Of the drawings.

For purposes of the operational example it will be assumed that master switch MS is closed as shown in FIG. 12 and that motor M is therefore energized over conductor CD1, potentiometer POT1, and conductors CD2 and CD3. It will be further assumed that the clutch C of clutch-brake means or assembly CBA is energized over conductor CD1, contacts RL1-RL2 of relay RL, conductor CD7, potentiometer POT2, and conductors CD8 and CD9. It will also be assumed that rocker arm RA and chuck CH have just transferred an article such as W to conveyor belt CB2, which has a first end located at said article receiving station or station B for receipt of transferred articles such as W, and that positive pressurized aeriform fluid has been and is still being supplied to chuck CH to assure release of said article from such chuck by blowing there against. Such positive pressurized fluid flows through conduit 46 (FIGS. 3 and 12) passage V1C and into chamber V1 (FIGS. 3 and 4) of valve means VM. It such time valve 40 is in its raised or open position by the high part C3A of cam wheel C3 pushing against wheel or roller 59 on the bottom of valve stem 40a. (See also FIG. 12). Said pressurized fluid therefore flows into chamber V1A in valve means VM and thence through passage 42 (FIG. 4) in such valve means into chamber V2 from whence it flows through passage 43 (FIGS. 3 and 5) and into chamber V3 in the valve means. From chamber V3 the fluid flows through the hollow of rockshaft RS (FIG. 1) to conduit or pipe 36 and thence through rotary union RU and tube 34 in arm 33 to the upper member 88 of chuck CH. The fluid then flows through passage 82 in chuck CH and out of the bottom of such chuck to impinge against the surface of the transferred article of ware and release it from the chuck onto the upper surface of conveyor belt CB2 as illustrated in FIG. 12.

Since previously mentioned clutch C of clutch-brake means CBA is energized or activated and, therefore, spur gear SG1 is being rotated in a counterclockwise direction, as indicated by the arrow shown in FIG. 7 on such spur gear, rack R is being moved upwardly to impart counterclockwise rotation to pinion gear PG and rotate rockshaft RS in a corresponding direction to actuate rocker arm RA and, thereby, chuck CH from article receiving station or station B towards the article transfer station or station A to which a succeeding piece of ware on article such as W has been delivered by conveyor belt CB1 for transfer of such article. Following a sufficient degree of said rotation of spur gear SG1, spur gear SG2 has been driven in a clockwise direction (as indicated by the arrow on gear SG2 in FIG. 7) to a sufficient degree to cause sufficient rotation of cam wheel C3 in a corresponding direction, indicated by the arrow on such cam in FIG. 12, so that the high part C3A of cam wheel C3 no longer presses against roller 59. Spring 56 of cam 40 (FIGS. 1 and 4) as well as the pressurized fluid supplied to chamber V1 pushes valve 40 downwardly to its seated or closed position and the flow of said fluid to chuck CH is thereby terminated.

When rack R is actuated by rotation of spur gear SG1 to a point substantially at or slightly past the midway point in its upward stroke as shown in FIGS. 1 and 7 and rocker arm has been started downwardly by further rotation of spur gear SG1, spur gear SG2 is also further rotated in its clockwise direction to impart corresponding rotation to cam wheel C1 and cause the high part C1A of such cam wheel to press against roller or wheel 69 on the bottom end of valve stem 41a of valve 41 and thereby actuate such valve to its open or unseated position. At such time vacuum supplied to conduit 47 (FIGS. 3 and 12) is supplied through passage V2C (FIGS. 3, 4 and 5) in valve means VM and thence to chamber V2A in such valve means. From chamber V2A the vacuum is supplied to chamber V2 in valve means VM and thence to passage 43 and over the previously described route of flow of the positive pressurized aeriform fluid to vacuum chuck CH. Thus, preparation for picking up the article or piece of ware such as W positioned on conveyor belt CB1 at station A is made.

During further upward actuation of rack R by further rotation of spur gear SG1, rocker arm RA and thereby chuck CH are actuated downwardly by further rotation of pinion gear PG and, when rack R approaches or reaches the end of its upward stroke, chuck CH has been actuated downwardly sufficiently that the bottom surface 91a of the strip of resilient material 91 on the bottom of chuck CH contacts the inner surface of the bottom of the article or piece of ware such as W positioned at station A for transfer thereof. The vacuum supplied to chuck CH at such time causes said article W to, of course, be held against said surface 91a at the bottom of the chuck for transfer of the article as discussed below.

Further rotation of spur SG1 moves rack R in its downward direction to impart clockwise rotation to pinion gear PG and rockshaft RS, and thereby actuate rocker arm RA, and chuck CH and the supported article W, from station A towards station B. At such time, and when the article has been lifted from the top surface of conveyor belt CB1 and is in the clear of a succeeding article such as W to be delivered to station A by conveyor belt CB1, timing drum TD actuates a contact to energize the motor which drives conveyor belt CB1 to deliver such other succeeding article or piece of ware, such as W, to transfer station A for pickup and transfer of such article. However, the control of the intermittent movement of conveyor belt CB1 to intermittently deliver articles or pieces of ware such as W to transfer station A for pickup and transfer thereof does not, per se, comprise a part of the present invention and, therefore, details of such control are not shown in the drawings. It should be pointed ut, however, that movable contact TD1 of timing drum TD is actuated by such timing drum in a selected or suitable time relationship or synchronism with the delivery of each said article such as W, to station A.

When rocker arm RA and chuck CH with its supported article or piece of ware such as W approaches or nears the delivery position of such article W to conveyor belt CB2 at the article receiving station or station B, cam wheel C2 has been rotated sufficiently that the high point C2A on such cam wheel C2 contacts roller or wheel 72 (FIGS. 2 and 12) on actuating arm 71 of limit switch LS so that movable contact LSC1 of such limit switch is momentarily actuated to open and interrupt the stick or holding circuit for relay RL which extends over contacts RL4–RL5 of such relay and normally maintains relay RL in its energized condition. Such deenergization of relay RL causes movable contact member RL1 to move from contact RL2 of such relay and open the energizing or activating circuit of clutch C of clutch-brake means or assembly CBA, and to close against contact RL3 to close the energizing or activating circuit to brake B of clutch-brake means CBA. Such operation of movable contact member RL1 of relay R brakes the otherwise substantially rapid movement of rocker arm RA and chuck CH towards their positions shown at station B in FIG. 12 of the drawings. However, cam C2 rotates sufficiently further so that contacts LSC1–LSC2 of switch LS again close to prepare the holding or stick circuit for relay RL.

Just prior to or immediately following the transfer of an article such as W to article receiving station or station B, cam wheel C1 has been rotated sufficiently so that the high part C1A of such wheel no longer pushes against roller or wheel 69 on valve stem 41a of valve 41 to actuate such valve to supply vacuum to chuck CH as previously described. Valve spring 67, aided by the vacuum supplied to chamber V2A in valve means VM, now causes valve 41 to become closed or seated and said supply of vacuum to chuck CH is interrupted. Substantially at the same time the high part C3A of cam wheel C3 pushes against roller 59 on stem 40a of valve 40 to again open or unseat such valve and again supply positive pressurized aeriform fluid to chuck CH over the fluid flow pressurized fluid circuit previously traced. As also previously mentioned, said positive pressurized fluid assures release of a transferred article such as W from the bottom article contacting surface 91a of the resilient strip of material 91 surrounding the lower end of chuck CH by, in effect, blowing the article such as W from in contact with said surface 91A.

Following the above described release of a transferred article such as W from chuck CH and onto conveyor belt CB2, timing drum TD momentarily actuates its movable contact member TD1 to close against fixed contact member TD2 and reenergize relay R which is then held in its energized condition by its holding or stick circuit including contacts LSC1–LSC2 of limit switch LS. The momentary closure of contacts TD1–TD2 of timing drum TD is, of course, dependent on the delivery of a succeeding article such as W to article transfer station or station A for transfer thereof and, if such a succeeding article has been so delivered to such station A, the apparatus again operates in the manner above described to transfer the succeeding article such as W to article receiving station or station B.

It is pointed out that positive pressurized aeriform fluid need not necessarily be provided to assure release of a transferred article such as W from chuck CH but that the termination or interruption of the vacuum holding such an article to such chuck may be considered sufficient for satisfactory release of such article. Furthermore, a potentiometer such as POT1 and a variable speed motor such as M need not necessarily be employed but motor M could be a constant speed motor and potentiometer POT1 dispensed with. Under such conditions potentiometers POT2 and POT3 are suitably adjusted to control the rate of activation of the clutch C and brake B, respectively, of clutch-brake means CBA. Furthermore, timing drum TD can be arranged to close contacts TD1–TD2 thereof in accordance with the speed of delivery of each article or piece of ware such as W to station A for transfer of such article. However, it must be assured that movable contact member LSC1 of limit switch LS opens to release rely RL to provide satisfactory braking of the apparatus prior to the closure of contacts TD1–TD2 of timing drum TD. This can be accomplished by suitable rotative positioning or adjustment of cam C2 on shaft or axle 76 of the apparatus. A limited amount of experimentation may be necessary in order to provide for the correct or optimum timing, or time relationship of and between the operation of the various components or parts of the apparatus disclosed. Furthermore, the apparatus disclosed need not necessarily be used for transferring articles or pieces of ware between conveyor belts as described herein, but such apparatus can be used for transferring such articles from any location, to and at which they are delivered and relatively precisely positioned, to any article receiving station or apparatus from which the articles are suitably moved so that a succeeding one of the articles can be similarly transferred without interference with a preceding transferred article.

It is also pointed out that, rather than the use of a piston rod driven by the usual piston and associated cylinder arrangement for the reciprocative actuation of a rack such as R between the ends of its reciprocative path of travel, that is, between the ends of its upward and downwards strokes as disclosed in the aforementioned patent to Rowe, the use of a crank means including a crank arm such as CA for imparting reciprocative motion to rack R inherently provides for smooth actuation of the rack away from the upper and lower ends of its said strokes or path of travel by providing gradually increasing acceleration between said ends and the midstroke point of the travel of said rack, and gradually decreasing deceleration between said midstroke point and the upper and lower ends of the path of travel or the strokes of the rack R. In other words, as crank arm CA moves between the position of spur gear SG1 which is the lowermost position for the pivotal connection of crank arm CA to such spur gear during the rotation of the spur gear, the upward movement of such crank arm CA and, thereby, rack R is gradually accelerated until rack R reaches the midway point illustrated in FIGS. 1 and 7 of the drawings. Thereafter, during further rotation of spur gear SG1 and upward movement of crank arm CA and rack R from said midway point, the upward movement of such crank arm and rack R is gradually decelerated until spur gear SG1 reaches the uppermost position for the pivotal connection of crank arm CA to such spur gear. Thus, gradually accelerated and decelerated upward movement of rack R is imparted to such rack by crank arm CA. After the pivotal connection of crank arm CA to spur gear SG1 reaches its uppermost position, similar acceleration is imparted to crank arm CA and, thereby, to rack R, during the further rotation of spur gear SG1 between said uppermost position of said pivotal connection and the midway position of the downward stroke of rack R, and similar deceleration is imparted to crank arm CA and, thereby, to rack R, during the further rotation of spur gear SG1 between said midway position of the downward stroke of rack R and the lowermost position of the pivotal connection of crank arm CA to spur gear SG1. Such movement of crank arm CA, and corresponding movement of rack R, impart a sinusoidal motion or smooth accelerating and decelerating reciprocating rotation of pinion gear PG, corresponding smooth rotation of rockshaft RS, and relatively smooth reciprocative sinusoidal motion or movement of rocker arm RA through its 180° path or arc of travel. Therefore, by the use of the crank means comprising spur gear SG1 and crank arm CA which are driven by a motor, such as M rotating at a constant speed, rather than by the usual piston rod including an associated piston and cylinder arrangement as previously mentioned, smooth accelerating and decelerating motion of the apparatus comprising the invention is inherently attained because the lower end of crank arm CA is driven through a circular path of motion or travel for the reciprocative vertical sinusoidal actuation of rack R.

Although there is herein shown and described in detail only one form of apparatus embodying the invention disclosed, it will be understood that various changes and modifications may be made in the invention within the purview of the appended claims and without departing from the spirit and scope thereof.

I claim:

1. Apparatus for individually transferring each of a plurality of disk or dish-like articles from an article transfer station, to which said articles are intermittently and sequentially delivered in a selected time sequence, to an article receiving station, such apparatus comprising, in combination;
    A. a rocker arm having a first end mounted on one end of a hollow rockshaft for reciprocative movement of said rocker arm through an approximately 180° vertical arc of travel whose first end is located at said transfer station and whose second end is located at said receiving station
    B. a hollow shaft secured adjacent its first end to the second end of said rocker arm and having its second end extending outwardly from such rocker arm in a direction substantially normal to said vertical arc of rotation of the rocker arm,
    C. a hollow tube extending snugly through said hollow shaft secured to said rocker arm and rotatable therein, such tube having first and second ends extending beyond said first and second ends respectively of such hollow shaft,
    D. an article transfer aeriform fluid chuck supported on said second end of said tube and embodying a fluid passage hermetically connecting with the hollow of said tube,
    E. a rotary union mounted on said first end of said tube and embodying a fluid passage hermetically connecting with the hollow of said tube,
    F. a toothed rack supported for sliding movement through a substantially vertical path of travel,
    G. a gear including a toothed gear sector of at least 180° with the teeth thereof meshing with the teeth of said rack and keyed to said rockshaft for movement therewith,
    H. a gear box including an input shaft and an output shaft,
    I. crank means connected to said output shaft of said gear box for driven rotation thereby and including a crankpin,
    J. a crank arm having a first end pivotally connected to said rack and a second end pivotally connected to said crankpin of said crank means,
    K. an electric motor connectable across a source of electrical power for energization thereof,
    L. an electrically actuated clutch-brake means connected to the output shaft of said motor and said input shaft of said gearbox,
    M. electric circuit means including electrical circuit controlling contacts for separately activating the clutch and brake of said clutch-brake means to transmit rotative motion from the output shaft of said motor to the input shaft of said gear box in a time relationship with the delivery of each said article to said transfer station and to interrupt such transmission of rotative motion and supply braking of the input shaft of said gear box each time said rocker arm nears said second end of its arc of travel,
    N. aeriform fluid conduit means hermetically connecting a first end of the hollow in said hollow rockshaft with said fluid passage in said rotary union, and
    O. valve means actuated in relationship with said reciprocative movement of said rocker arm for supplying negative aeriform fluid pressure to the second end of the hollow in said hollow rockshaft prior to said rocker arm reaching said first end of its said arc of travel during movement of such rocker arm towards such first end and for interrupting said supply of negative pressure when said rocker arm reaches said second end of its said arc of travel.

2. Apparatus in accordance with claim 1 and in which said valve means supplies positive aeriform fluid pressure to said second end of the hollow in said hollow rockshaft when said supply of negative pressure thereto is interrupted at said second end of the arc of travel of said rocker arm.

3. Apparatus in accordance with claim 2 and in which said crank means comprises a first spur gear having a face pivotally connected to said second end of said crank arm and said valve means is actuated by cam wheels keyed to a shaft which is driven by a second spur gear having teeth meshing with the teeth of said first spur gear.

4. Apparatus in accordance with claim 3 and in which said clutch of said clutch-brake means is energized over an electrical circuit controlling contact of said electric circuit means for transmission of said rotative motion from the output shaft of said motor to the input shaft of said gearbox.

5. Apparatus in accordance with claim 4 and in which said brake of said clutch-brake means is energized an electrical circuit controlling contact of said circuit means to supply said braking of the input shaft of said gear box.

6. Apparatus in accordance with claim 2 and in which said clutch of said clutch-brake means is energized over an electrical circuit controlling contact of said electric circuit means for transmission of said rotative motion from the output shaft of said motor to the input shaft of said gearbox.

7. Apparatus in accordance with claim 6 and in which said brake of said clutch-brake means is energized over an electrical circuit controlling contact of said circuit means to supply said braking of the input shaft of said gearbox.

8. Apparatus in accordance with claim 1 and in which said crank means comprises a first spur gear having a face pivotally connected to said second end of said crank arm and said valve means is actuated by cam wheels keyed to a shaft which is driven by a second spur gear having teeth meshing with the teeth of said first spur gear.

9. Apparatus in accordance with claim 8 and in which said clutch of said clutch-brake means is energized over an electrical circuit controlling contact of said electric circuit means for transmission of said rotative motion from the output shaft of said motor to the input shaft of said gearbox.

10. Apparatus in accordance with claim 9 and in which said brake of said clutch-brake means is energized over an electrical circuit controlling contact of said circuit means to supply said braking of the input shaft of said gear box.

11. Apparatus in accordance with claim 1 and in which said clutch of said clutch-brake means is energized over an electrical circuit controlling contact of said electric circuit means for transmission of said rotative motion from the output shaft of said motor to the input shaft of said gearbox.

12. Apparatus in accordance with claim 11 and in which said brake of said clutch-brake means is energized over an electrical circuit controlling contact of said circuit means to supply said braking of the input shaft of said gearbox.

13. Apparatus for individually and sequentially transferring to an article receiving station each of a sequence of relatively flat or dish-like articles intermittently delivered in a selected time sequence to an article transfer station, such apparatus comprising;

A. an upright housing for said apparatus,
B. a horizontal rockshaft rotatably supported by said housing with the ends thereof extending exteriorly of said housing,
C. a rocker arm having a first end secured to one end of said rockshaft for rotational movement therewith and a second end connected to a hollow horizontally extending shaft supporting a vacuum chuck depending vertically therefrom,
D. a pinion gear comprising a toothed gear sector of at least 180° and keyed to said rockshaft within said housing,
E. a rack having teeth meshing with the teeth of said pinion gear and supported in said housing for substantially vertical reciprocative movement thereof within the housing.
F. a spur gear rotatably disposed below said rack within said housing and keyed to an output shaft extending into said housing from a gear box attached to a wall of the housing,
G. a crank arm having a first end rotatably connected with one end of said rack and a second end rotatably and eccentrically connected with one face of said spur gear for reciprocative movement of said rack for driven reciprocative rotation of said pinion gear through approximately 180° of reciprocative rotational movement thereof by each 180° of rotation of said spur gear,
H. an electric motor including an output shaft,
I. an electrically controlled clutch-brake operatively connected between said output shaft of said motor and the input shaft of said gearbox,
J. valve means for at selected times supplying negative fluid pressure to said vacuum chuck and actuated in relationship with the movement of said second end of said rocker arm through an approximately vertical 180° arc of travel extending between said article receiving station and said article transfer station, and
K. electrical circuit means actuated in synchronism with the delivery of each said article to said transfer station and the transfer of each said article to said receiving station for energizing said clutch-brake to selectively connect said output shaft of said motor to said input shaft of said gearbox following each pickup and delivery of an article by said vacuum chuck and to disconnect said output shaft of said motor from said input shaft of said gearbox and brake the input shaft of the gearbox just prior to the arrival of said vacuum chuck at said article receiving station.

14. Apparatus in accordance with claim 13 and in which said valve means are actuated to supply positive fluid pressure to said vacuum chuck immediately following the transfer of each said article to said article receiving station.

* * * * *